United States Patent
Yamamoto (12)

(10) Patent No.: US 8,614,671 B2
(45) Date of Patent: Dec. 24, 2013

(54) INPUT APPARATUS, CONTROL APPARATUS, CONTROL SYSTEM, AND CONTROL METHOD

(75) Inventor: Kazuyuki Yamamoto, Kanagawa (JP)

(73) Assignee: Sony Corporation, Tokyo (JP)

(*) Notice: Subject to any disclaimer, the term of this patent is extended or adjusted under 35 U.S.C. 154(b) by 1014 days.

(21) Appl. No.: 12/687,401

(22) Filed: Jan. 14, 2010

(65) Prior Publication Data

US 2010/0238112 A1 Sep. 23, 2010

(30) Foreign Application Priority Data

Mar. 17, 2009 (JP) .................. 2009-064730

(51) Int. Cl.
*G06F 3/033* (2013.01)

(52) U.S. Cl.
USPC ............................ 345/158; 345/156; 345/157

(58) Field of Classification Search
USPC ........................................... 345/158
See application file for complete search history.

(56) References Cited

U.S. PATENT DOCUMENTS

| 5,453,758 | A | 9/1995 | Sato |
| 7,973,766 | B2* | 7/2011 | Jeng et al. ............ 345/158 |
| 2009/0009471 | A1* | 1/2009 | Yamamoto et al. ...... 345/158 |

FOREIGN PATENT DOCUMENTS

| JP | 2001-56743 | 2/2001 |
| JP | 2005-56409 | 3/2005 |

OTHER PUBLICATIONS

U.S. Appl. No. 12/628,526, filed Dec. 1, 2009, Yamamoto.
U.S. Appl. No. 12/631,948, filed Dec. 7, 2009, Nikura, et al.
U.S. Appl. No. 12/637,005, filed Dec. 14, 2009, Yamamoto, et al.
U.S. Appl. No. 12/636,938, filed Dec. 14, 2009, Yamamoto, et al.

* cited by examiner

*Primary Examiner* — Amare Mengistu
*Assistant Examiner* — Sarvesh J Nadkarni
(74) *Attorney, Agent, or Firm* — Oblon, Spivak, McClelland, Maier & Neustadt, L.L.P.

(57) ABSTRACT

An input apparatus includes: a casing; a first acceleration detection section to detect a first acceleration value of the casing in a first direction; a first angle-related value detection section to detect a first angle-related value of the casing about an axis in a second direction; a radius gyration calculation section to calculate, based on the first acceleration value and first angle-related value, a first radius gyration of the casing about the axis in the second direction, the first radius gyration being a distance from a rotational center axis to the first acceleration detection section; and a pseudo velocity calculation section to generate a first pseudo radius related to a magnitude of the first radius gyration and calculate a first pseudo velocity value of the casing in the first direction by multiplying the first pseudo radius by a first angular velocity value obtained from the first angle-related value.

18 Claims, 14 Drawing Sheets

INPUT APPARATUS, CONTROL APPARATUS, CONTROL SYSTEM, AND CONTROL METHOD

BACKGROUND OF THE INVENTION

1. Field of the Invention

The present invention relates to a 3-dimensional operation input apparatus used for operating, for example, GUIs (Graphical User Interfaces), a control apparatus for controlling the GUIs in accordance with operational information, a control system including those apparatuses, and a control method.

2. Description of the Related Art

Pointing devices, particularly a mouse and a touchpad, are used as controllers for GUIs widely used in PCs (Personal Computers). Not just as HIs (Human Interfaces) of PCs of the related art, the GUIs are now starting to be used as interfaces for AV equipment and game machines used in living rooms etc. with televisions as image media. Various pointing devices that a user is capable of operating 3-dimensionally are proposed as controllers for the GUIs of this type (see, for example, Japanese Patent Application Laid-open No. 2001-56743 (paragraphs (0030) and (0031), FIG. 3) and Japanese Patent Application Laid-open No. 2005-56409 (paragraphs (0018), (0021), and (0022), FIGS. 1 and 2); hereinafter, respectively referred to as Patent Documents 1 and 2).

Patent Document 1 discloses an input apparatus including angular velocity gyroscopes of two axes, that is, two angular velocity sensors. When a user holds the input apparatus in hand and swings it vertically and laterally, for example, the angular velocity sensors detect angular velocities about two orthogonal axes, and a signal as positional information of a cursor or the like displayed by a display means is generated in accordance with the angular velocities. The signal is transmitted to a control apparatus, and the control apparatus controls display so that the cursor moves on a screen in response to the signal.

In addition, Patent Document 2 discloses a technique of detecting accelerations of a pen-type input apparatus using two acceleration sensors, and calculating movement amounts of the pen-type input apparatus by integrating the accelerations.

SUMMARY OF THE INVENTION

As described above, in the input apparatus disclosed in Patent Document 1, the movement of the cursor displayed on the screen is controlled in accordance with the angular velocities detected by the two angular velocity sensors. In other words, a movement amount of the cursor displayed on the screen depends on the angular velocities detected by the two angular velocity sensors.

Therefore, if the user imparts a large angular velocity to the input apparatus, the cursor displayed on the screen moves at a high velocity in accordance therewith. For example, when the user operates the input apparatus using a turn of a hand, even when the actual movement amount of the input apparatus is small, the cursor moves at a high velocity.

However, in a case where the user operates the input apparatus while imparting only a small angular velocity, even when the actual movement amount of the input apparatus is large, the cursor on the screen moves only slightly. For example, in a case where the user operates the input apparatus by swinging an entire arm using a shoulder as an axis, the cursor moves only slightly in spite of the actual movement amount of the input apparatus. As described above, there are cases where the movement of the cursor does not match a sense of the user.

On the other hand, the pen-type input apparatus described in Patent Document 2 calculates the movement amount of the pen-type input apparatus using the acceleration sensors. In this case, since the movement amount of the cursor is calculated in accordance with the accelerations detected by the acceleration sensors, the movement amount of the cursor displayed on the screen increases in proportion to the movement amount of the pen-type input apparatus. However, because an integration error is caused when calculating the movement amount of the cursor by integrating the accelerations detected in the input apparatus, precise control cannot be performed. Therefore, the movement of the cursor becomes a movement that does not match the sense of the user.

In view of the circumstances as described above, an object of the present invention is to provide an input apparatus, a control apparatus, a control system, and a control method that are capable of making a movement of a UI on a screen a natural movement that matches an intuition of a user.

According to an embodiment of the present invention, there is provided an input apparatus including a casing, a first acceleration detection section, a first angle-related value detection section, a radius gyration calculation means, and a pseudo velocity calculation means.

The first acceleration detection section detects a first acceleration value of the casing in a first direction.

The first angle-related value detection section detects a first angle-related value of the casing as a value related to an angle about an axis in a second direction different from the first direction.

The radius gyration calculation means calculates, based on the first acceleration value and the first angle-related value that have been detected, a first radius gyration of the casing about the axis in the second direction, the first radius gyration being a distance from a rotational center axis whose position changes with time to the first acceleration detection section.

The pseudo velocity calculation means generates a first pseudo radius related to a magnitude of the calculated first radius gyration and calculates a first pseudo velocity value as a velocity value of the casing in the first direction by multiplying the generated first pseudo radius by a first angular velocity value obtained based on the first angle-related value.

When a user operates a UI displayed on a screen using a rotation of at least one of a shoulder, an elbow, a wrist, a hand, or the like, a radius gyration that changes with time generally exists in the input apparatus. In the input apparatus, a velocity value of the input apparatus can be calculated by calculating a radius gyration of the input apparatus about an axis in a vertical direction, for example, and multiplying the radius gyration by the angular velocity value. By thus calculating the velocity value based on the radius gyration, even when the user operates the input apparatus by swinging the entire arm using the shoulder as an axis, a sufficient output (velocity value) can be obtained. Accordingly, the movement of the UI on the screen becomes a natural movement with respect to the movement of the input apparatus, with the result that an operability of the input apparatus for the user is improved.

Moreover, according to the input apparatus, since the velocity value is calculated based on the first acceleration value and the first angle-related value instead of calculating the velocity value by simply integrating the first acceleration value, integration errors are reduced, and it thus becomes possible to calculate the velocity value of the casing with high accuracy.

The first pseudo radius is generated in relation to the magnitude of the first radius gyration. Typically, the first pseudo radius is generated so as to take a larger value as the calculated radius gyration increases. The first pseudo radius may have a minimum value and a maximum value. Accordingly, even when the calculated radius gyration is inappropriate, the operability can be prevented from being lowered. Alternatively, it is possible to set a plurality of threshold values to the magnitude of the radius gyration and select one of a plurality of pseudo radius values based on a comparison with the threshold values. With this structure, it becomes possible to obtain a desirable operability of the input apparatus.

The radius gyration calculation means may calculate an acceleration change rate as a time change rate of the first acceleration value and calculate an angular acceleration change rate as a time change rate of an angular acceleration about the axis in the second direction based on the detected first angle-related value. The radius gyration calculation means may further calculate a ratio of the calculated acceleration change rate to the calculated angular acceleration change rate as the first radius gyration.

The acceleration change rate is obtained by temporally differentiating the first acceleration value. Similarly, the angular acceleration change rate is obtained by temporally differentiating the first angle-related value. Particularly when detecting the first acceleration value, a gravity acceleration is detected while being biased by a constant value or biased in terms of a low frequency. Therefore, by differentiating the first acceleration value, even when a change in a component force of the gravity acceleration due to a tilt of the input apparatus is caused, the radius gyration can be calculated appropriately, and an appropriate velocity value can be calculated from the radius gyration.

The radius gyration calculation means may calculate an angular acceleration value based on the detected first angle-related value and calculate a ratio of the first acceleration value to the angular acceleration value as the first radius gyration. With this structure, a calculation amount and power consumption of the input apparatus can be reduced.

According to an embodiment of the present invention, there is provided a control apparatus controlling display of a pointer displayed on a screen based on information transmitted from an input apparatus, the control apparatus including a reception means, a radius gyration calculation means, a pseudo velocity calculation means, and a coordinate information generation means.

The input apparatus includes a casing, a first acceleration detection section that detects a first acceleration value of the casing in a first direction, a first angle-related value detection section that detects a first angle-related value of the casing as a value related to an angle about an axis in a second direction different from the first direction, and a transmission means for transmitting the information on the first acceleration value and the first angle-related value.

The reception means receives the transmitted information on the first acceleration value and the first angle-related value.

The radius gyration calculation means calculates, based on the first acceleration value and the first angle-related value that have been received, a first radius gyration of the casing about the axis in the second direction, the first radius gyration being a distance from a rotational center axis whose position changes with time to the first acceleration detection section.

The pseudo velocity calculation means generates a first pseudo radius related to a magnitude of the calculated first radius gyration and calculates a first pseudo velocity value as a velocity value of the casing in the first direction by multiplying the generated first pseudo radius by a first angular velocity value obtained based on the first angle-related value.

The coordinate information generation means generates coordinate information of the pointer on the screen that corresponds to the calculated first pseudo velocity value.

It should be noted that the preamble part "control apparatus . . . casing . . . " in the scope of claims is presented for clarifying the content of the present invention, and the inventors of the present invention have no intention of presenting the preamble part as a well-known technique.

According to an embodiment of the present invention, there is provided a control system including an input apparatus and a control apparatus.

The input apparatus includes a casing, a first acceleration detection section, a first angle-related value detection section, a radius gyration calculation means, a pseudo velocity calculation means, and a transmission means.

The first acceleration detection section detects a first acceleration value of the casing in a first direction. The first angle-related value detection section detects a first angle-related value of the casing as a value related to an angle about an axis in a second direction different from the first direction. The radius gyration calculation means calculates, based on the first acceleration value and the first angle-related value that have been detected, a first radius gyration of the casing about the axis in the second direction, the first radius gyration being a distance from a rotational center axis whose position changes with time to the first acceleration detection section. The pseudo velocity calculation means generates a first pseudo radius related to a magnitude of the calculated first radius gyration and calculates a first pseudo velocity value as a velocity value of the casing in the first direction by multiplying the generated first pseudo radius by a first angular velocity value obtained based on the first angle-related value. The transmission means transmits information on the calculated first pseudo velocity value.

The control apparatus includes a reception means and a coordinate information generation means.

The reception means receives the transmitted information on the first pseudo velocity value. The coordinate information generation means generates coordinate information of a pointer on a screen that corresponds to the received first pseudo velocity value.

According to another embodiment of the present invention, there is provided a control system including an input apparatus and a control apparatus.

The input apparatus includes a casing, a first acceleration detection section, a first angle-related value detection section, and a transmission means.

The first acceleration detection section detects a first acceleration value of the casing in a first direction. The first angle-related value detection section detects a first angle-related value of the casing as a value related to an angle about an axis in a second direction different from the first direction. The transmission means transmits information on the first acceleration value and the first angle-related value.

The control apparatus includes a reception means, a radius gyration calculation means, a pseudo velocity calculation means, and a coordinate information generation means.

The reception means receives the transmitted information on the first acceleration value and the first angle-related value. The radius gyration calculation means calculates, based on the first acceleration value and the first angle-related value that have been received, a first radius gyration of the casing about the axis in the second direction, the first radius gyration being a distance from a rotational center axis whose position changes with time to the first acceleration detection section.

The pseudo velocity calculation means generates a first pseudo radius related to a magnitude of the calculated first radius gyration and calculates a first pseudo velocity value as a velocity value of the casing in the first direction by multiplying the generated first pseudo radius by a first angular velocity value obtained based on the first angle-related value. The coordinate information generation means generates coordinate information of a pointer on a screen that corresponds to the calculated first pseudo velocity value.

According to an embodiment of the present invention, there is provided a control method including detecting a first acceleration value of a casing of an input apparatus in a first direction.

A first angle-related value of the casing as a value related to an angle about an axis in a second direction different from the first direction is detected.

Based on the first acceleration value and the first angle-related value that have been detected, a first radius gyration of the casing about the axis in the second direction is calculated, the first radius gyration being a distance from a rotational center axis whose position changes with time to a detection position of the first acceleration value.

A first pseudo radius related to a magnitude of the calculated first radius gyration is generated.

A first pseudo velocity value as a velocity value of the casing in the first direction is calculated based on the generated first pseudo radius and a first angular velocity value obtained based on the first angle-related value.

According to another embodiment of the present invention, there is provided a control apparatus controlling display of a pointer displayed on a screen based on information transmitted from an input apparatus including a casing, a first acceleration detection section that detects a first acceleration value of the casing in a first direction, a first angle-related value detection section that detects a first angle-related value of the casing as a value related to an angle about an axis in a second direction different from the first direction, and a transmission means for transmitting the information on the first acceleration value and the first angle-related value, the control apparatus including: a reception section to receive the transmitted information on the first acceleration value and the first angle-related value; a radius gyration calculation section to calculate, based on the first acceleration value and the first angle-related value that have been received, a first radius gyration of the casing about the axis in the second direction, the first radius gyration being a distance from a rotational center axis whose position changes with time to the first acceleration detection section; a pseudo velocity calculation section to generate a first pseudo radius related to a magnitude of the calculated first radius gyration and calculate a first pseudo velocity value as a velocity value of the casing in the first direction by multiplying the generated first pseudo radius by a first angular velocity value obtained based on the first angle-related value; and a coordinate information generation section to generate coordinate information of the pointer on the screen that corresponds to the calculated first pseudo velocity value.

As described above, according to the embodiments of the present invention, an input apparatus, a control apparatus, a control system, and a control method that are capable of making a movement of a UI on a screen a natural movement that matches an intuition of a user can be provided.

These and other objects, features and advantages of the present invention will become more apparent in light of the following detailed description of best mode embodiments thereof, as illustrated in the accompanying drawings.

DESCRIPTION OF PREFERRED EMBODIMENTS

Hereinafter, embodiments of the present invention will be described with reference to the drawings.
(Control System)

Figure 1:
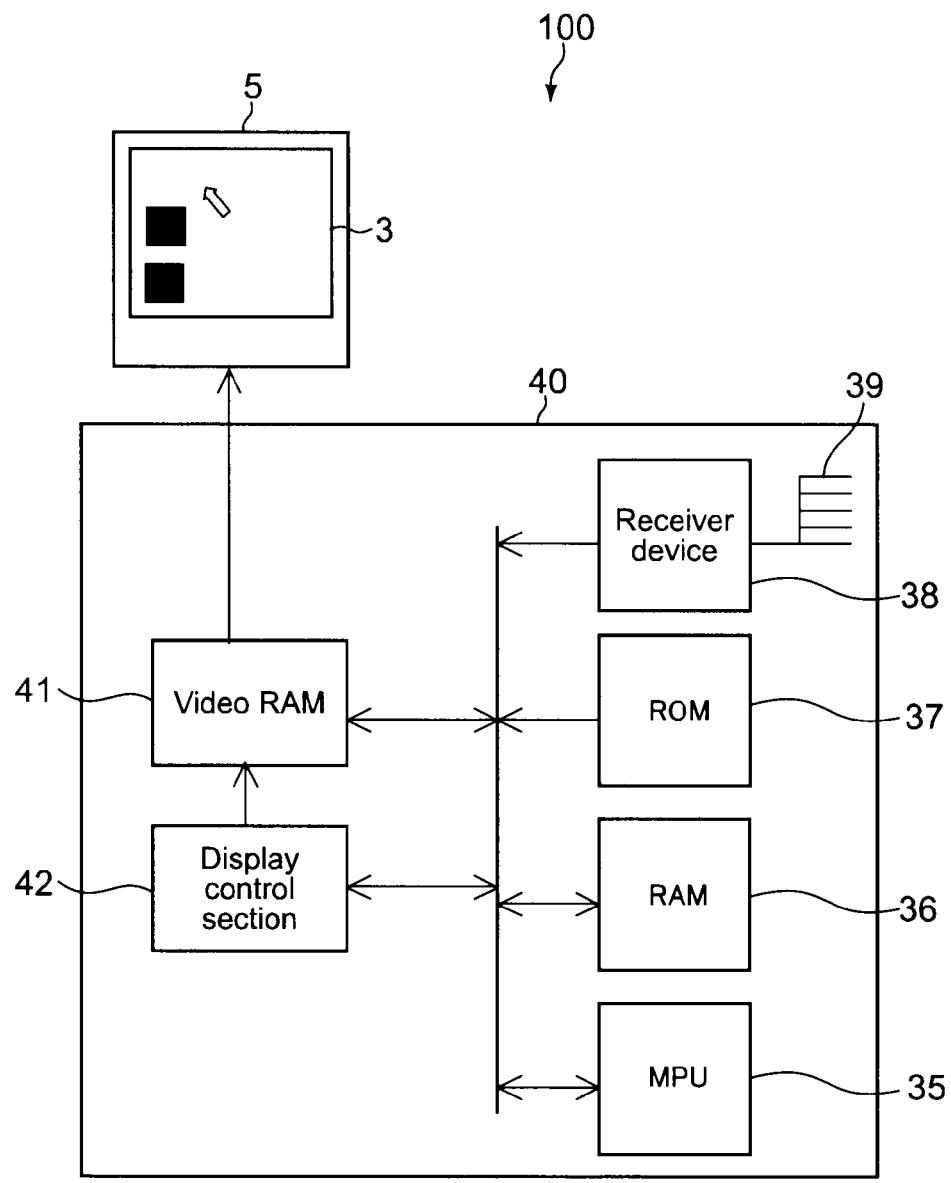
FIG. 1 is a diagram showing a control system according to an embodiment of the present invention.

FIG. 1 is a diagram showing a control system according to an embodiment of the present invention. A control system 100 includes a display apparatus 5, a control apparatus 40, and an input apparatus 1.

Figure 2:
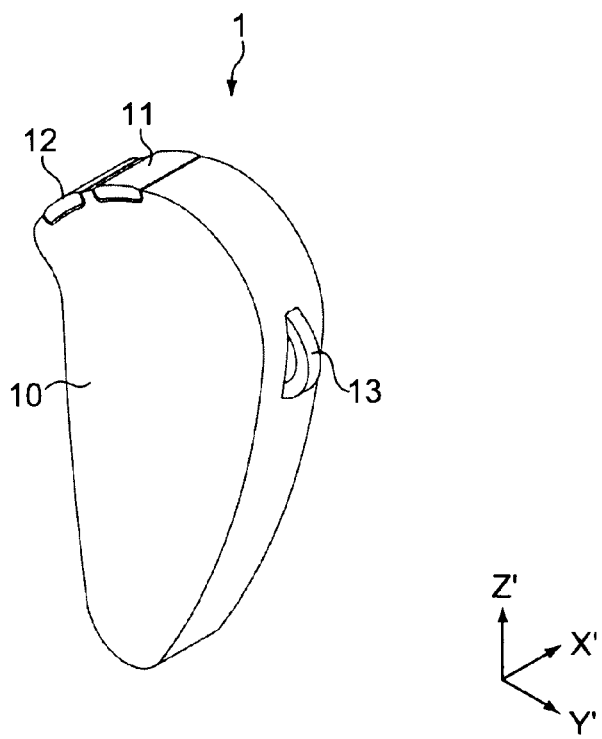
FIG. 2 is a perspective view showing an input apparatus.

FIG. 2 is a perspective view showing the input apparatus 1. The input apparatus 1 is of a size that a user is capable of holding. The input apparatus 1 includes a casing 10 and operation sections including two buttons 11 and 12 provided at an upper portion of the casing 10, a rotary wheel button 13, and the like, for example. The button 11 disposed closer to the center of the upper portion of the casing 10 functions as a left button of a mouse as an input device for a PC, for example, and the button 12 adjacent to the button 11 functions as a right button of a mouse.

For example, a "drag and drop" operation may be executed by moving the input apparatus 1 while press-and-holding the button 11, a file may be opened by double-clicking the button 11, and a screen 3 may be scrolled by the wheel button 13.

Locations of the buttons 11 and 12 and the wheel button 13, a content of a command issued, and the like can be changed as appropriate.

Figure 3:
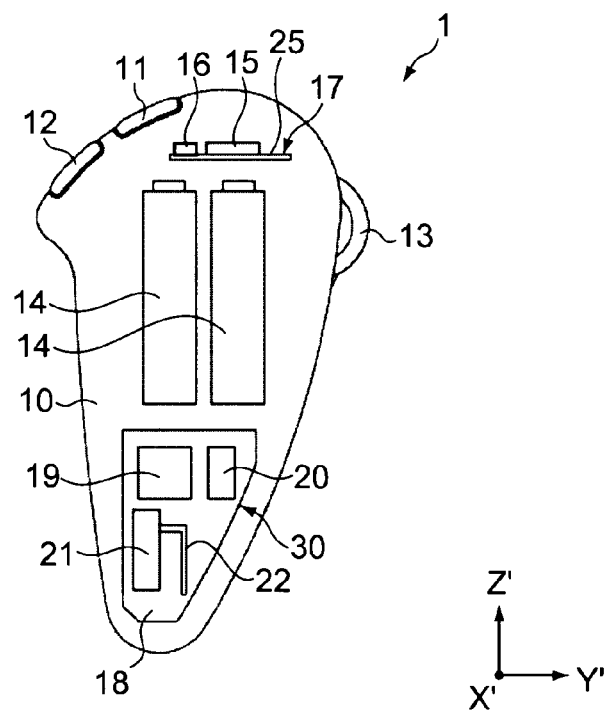
FIG. 3 is a diagram schematically showing an internal structure of the input apparatus.
Figure 4:
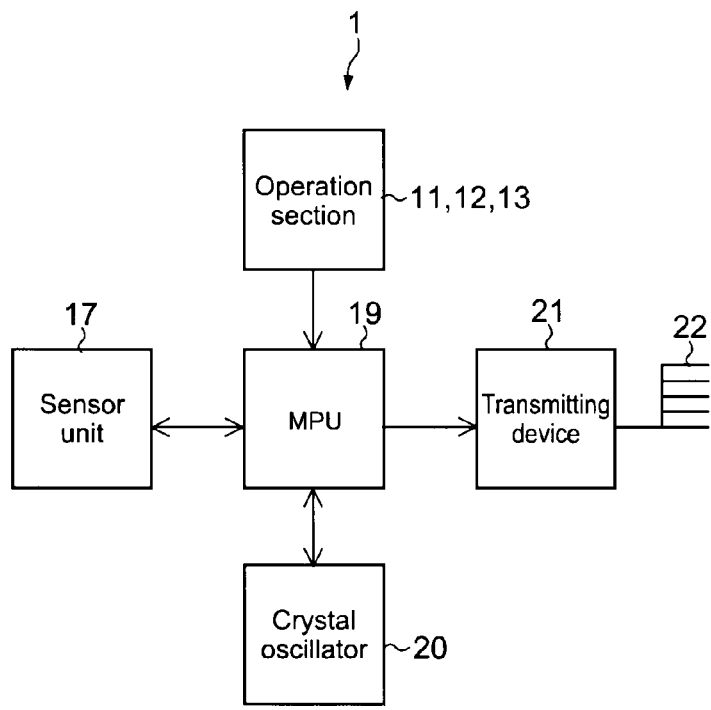
FIG. 4 is a block diagram showing an electrical structure of the input apparatus.

FIG. 3 is a diagram schematically showing an internal structure of the input apparatus 1. FIG. 4 is a block diagram showing an electrical structure of the input apparatus 1.

The input apparatus 1 includes a sensor unit 17, a control unit 30, and batteries 14.

Figure 8:
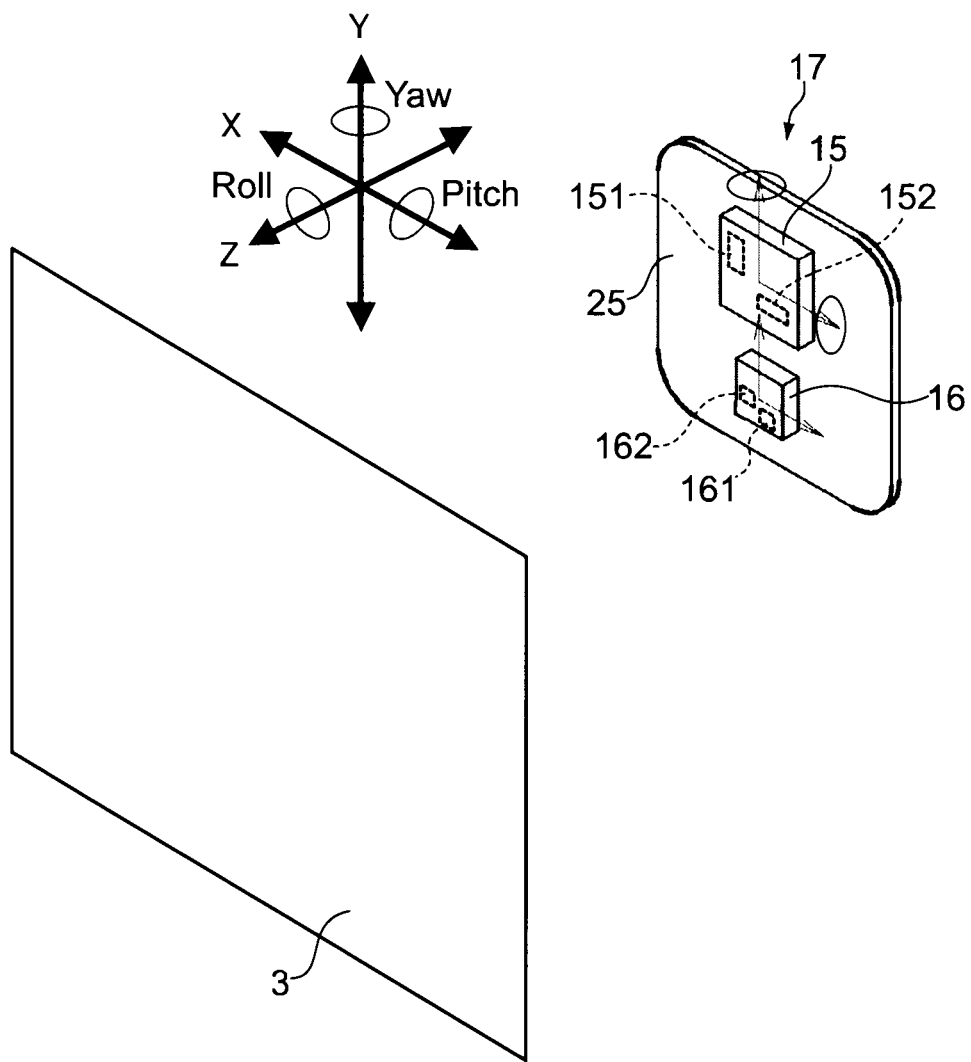
FIG. 8 is a perspective view showing a sensor unit.

FIG. 8 is a perspective view showing the sensor unit 17.

The sensor unit 17 includes an acceleration sensor unit 16 (acceleration detection section) for detecting accelerations in different angles such as along two orthogonal axes (X axis and Y axis). Specifically, the acceleration sensor unit 16 includes two sensors, that is, an acceleration sensor 161 for an X-axis direction and an acceleration sensor 162 for a Y-axis direction.

The sensor unit 17 further includes an angular velocity sensor unit 15 (angle-related value detection section) for detecting angular accelerations about the two orthogonal axes. Specifically, the angular velocity sensor unit 15 includes two sensors, that is, an angular velocity sensor 151 for a yaw direction and an angular velocity sensor 152 for a pitch direction. The acceleration sensor unit 16 and the angular velocity sensor unit 15 are packaged and mounted on a circuit board 25.

As each of the angular velocity sensors 151 and 152 for the yaw and pitch directions, respectively, a vibration gyro sensor for detecting Coriolis force in proportion to an angular velocity is used. As each of the acceleration sensors 161 and 162 for the X- and Y-axis directions, respectively, any sensor such as a piezoresistive sensor, a piezoelectric sensor, and a capacitance sensor may be used. The angular velocity sensors 151 and 152 are not limited to the vibration gyro sensor, and a rotary top gyro sensor, a ring laser gyro sensor, a gas rate gyro sensor, and the like may be used instead.

In descriptions on FIGS. 2 and 3, a longitudinal direction of the casing 10 is referred to as Z' direction, a thickness direction of the casing 10 is referred to as X' direction, and a width direction of the casing 10 is referred to as Y' direction for convenience. In this case, the sensor unit 17 is incorporated into the casing 10 such that a surface of the circuit board 25 on which the acceleration sensor unit 16 and the angular velocity sensor unit 15 are mounted becomes substantially parallel to an X'-Y' plane. As described above, the sensor units 16 and 15 each detect physical amounts with respect to the two axes, that is, the X axis and the Y axis. In descriptions below, with regard to a movement of the input apparatus 1, a rotational direction about the X' axis is sometimes referred to as pitch direction, a rotational direction about the Y' axis is sometimes referred to as yaw direction, and a rotational direction about the Z' axis (roll axis) is sometimes referred to as roll direction.

The control unit 30 includes a main substrate 18, an MPU 19 (Micro Processing Unit) (or CPU) mounted on the main substrate 18, a crystal oscillator 20, a transmitting device 21, and an antenna 22 printed on the main substrate 18.

The MPU 19 includes a built-in volatile or nonvolatile memory requisite therefor. The MPU 19 is input with a detection signal from the sensor unit 17, an operation signal from the operation section, and the like, and executes various kinds of operational processing in order to generate predetermined control signals in response to those input signals. The memory may be provided separate from the MPU 19.

Typically, the sensor unit 17 outputs analog signals. In this case, the MPU 19 includes an A/D (Analog/Digital) converter. Alternatively, the sensor unit 17 may be a unit that includes the A/D converter.

The MPU 19 alone or the MPU 19 and the crystal oscillator 20 constitutes/constitute a processing unit.

The transmitting device 21 (transmission means) transmits, as RF radio signals, the control signals (input information) generated in the MPU 19 to the control apparatus 40 via the antenna 22. At least one of the transmitting device 21 and the antenna 22 constitutes a transmission unit.

The crystal oscillator 20 generates clocks and supplies them to the MPU 19. As the batteries 14, dry cell batteries, rechargeable batteries, and the like are used.

The control apparatus 40 includes an MPU 35 (or CPU), a display control section 42, a RAM 36, a ROM 37, a video RAM 41, an antenna 39, and a receiver device 38.

The receiver device 38 receives the control signal transmitted from the input apparatus 1 via the antenna 39. The MPU 35 analyzes the control signal and executes various kinds of operational processing. The display control section 42 mainly generates screen data to be displayed on the screen 3 of the display apparatus 5 under control of the MPU 35. The video RAM 41 as a working area of the display control section 42 temporarily stores the generated screen data.

The control apparatus 40 may be an apparatus dedicated to the input apparatus 1, or may be a PC or the like. The control apparatus 40 is not limited to the PC, and may be a computer integrally formed with the display apparatus 5, audiovisual equipment, a projector, a game device, a car navigation system, or the like.

Examples of the display apparatus 5 include a liquid crystal display and an EL (Electro-Luminescence) display, but are not limited thereto. The display apparatus 5 may alternatively be an apparatus integrally formed with a display and capable of receiving television broadcasts and the like.

Figure 5:
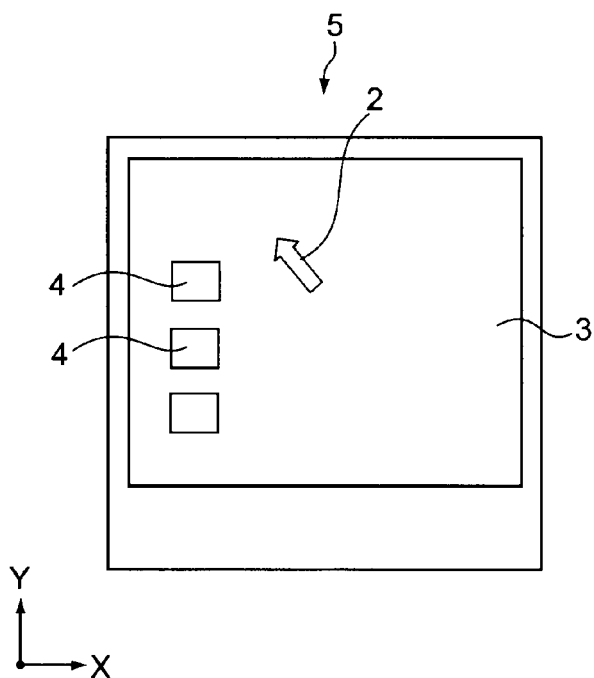
FIG. 5 is a diagram showing an example of a screen displayed on a display apparatus.

FIG. 5 is a diagram showing an example of the screen 3 displayed on the display apparatus 5. UIs such as icons 4 and a pointer 2 are displayed on the screen 3. The icons are images on the screen 3 representing functions of programs, execution commands, file contents, and the like of the computer. It should be noted that on the screen 3, the horizontal direction is referred to as X-axis direction and the vertical direction is referred to as Y-axis direction. Unless clearly stated in particular, to help understand descriptions below, the UI as an operation target of the input apparatus 1 will be described as being the pointer 2 (so-called cursor).

Figure 6:
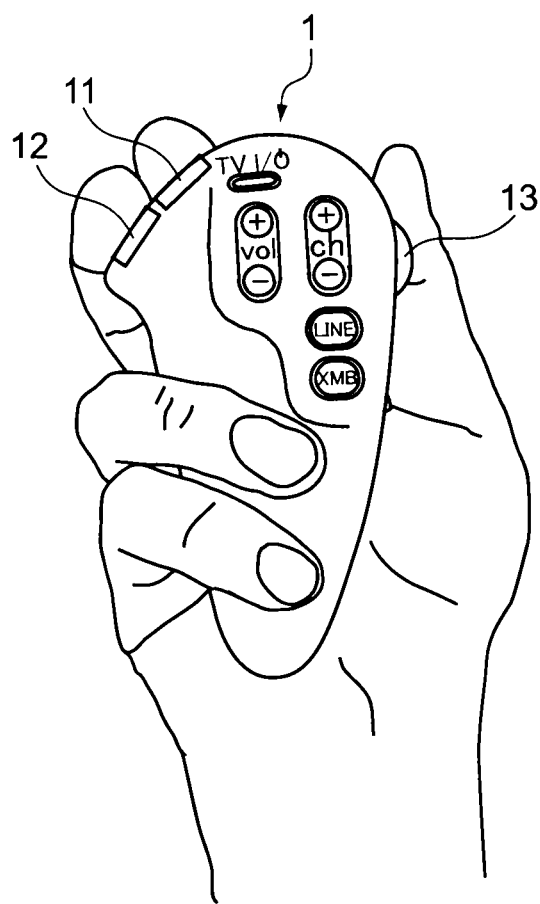
FIG. 6 is a diagram showing a state where a user is holding the input apparatus.

FIG. 6 is a diagram showing a state where a user is holding the input apparatus 1. As shown in FIG. 6, the input apparatus 1 may include, in addition to the buttons 11, 12, and 13, operation sections including various operation buttons such as those provided to a remote controller for operating a television or the like and a power supply switch, for example. When the user moves the input apparatus 1 in the air or operates the operation sections while holding the input apparatus 1 as shown in the figure, input information thereof is output to the control apparatus 40, and the control apparatus 40 controls the UI.

(Typical Operation of Input Apparatus)

Next, a description will be given on typical examples of ways of moving the input apparatus 1 and ways the pointer 2 moves on the screen 3 accordingly. FIG. 7 are explanatory diagrams therefor.

Figure 7A:
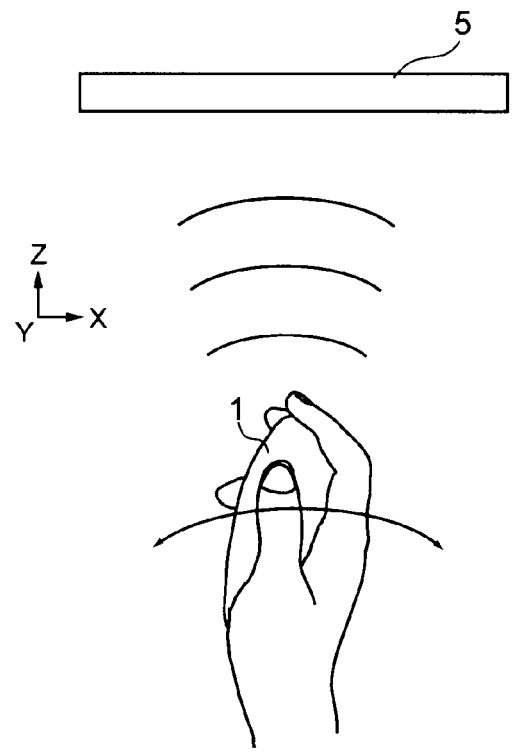
FIG. 7 are explanatory diagrams showing typical examples of ways of moving the input apparatus and ways a pointer moves on the screen accordingly.
Figure 7B:
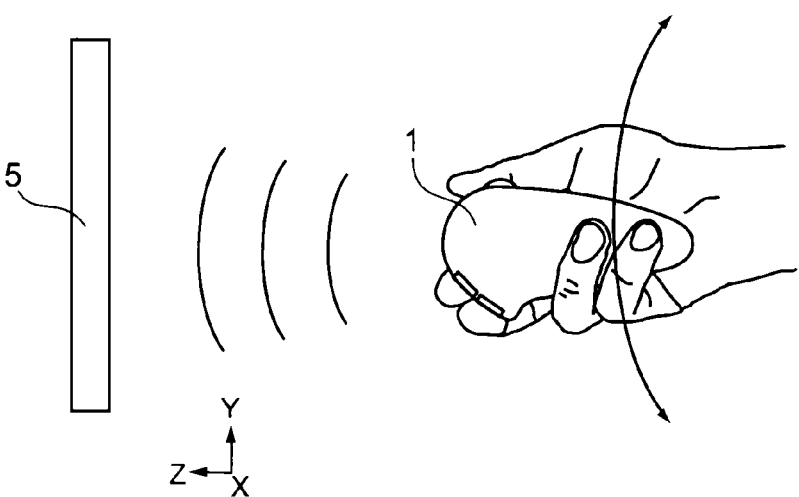

As shown in FIGS. 7A and 7B, the user holds the input apparatus 1 so as to aim the buttons 11 and 12 side of the input apparatus 1 at the display apparatus 5 side. The user holds the input apparatus 1 so that a thumb is located on an upper side and a pinky is located on a lower side as in handshakes. In this state, the circuit board 25 of the sensor unit 17 (see FIG. 8) is close to being in parallel with the screen 3 of the display apparatus 5, and the two axes as detection axes of the sensor unit 17 respectively correspond to the horizontal axis (X axis) and the vertical axis (Y axis) on the screen 3. Hereinafter, the position of the input apparatus 1 as shown in FIGS. 7A and 7B will be referred to as reference position.

In descriptions below, a coordinate system stationary on earth, that is, an inertial coordinate system is expressed using the X axis, the Y axis, and the Z axis, whereas a coordinate system that moves integrally with the input apparatus 1 (coordinate system of input apparatus 1) is expressed using the X' axis, the Y' axis, and the Z' axis.

As shown in FIG. 7A, in the reference position, the user swings a hand or an arm in the lateral direction, that is, the yaw direction. At this time, the acceleration sensor 161 for the X'-axis direction detects an acceleration $a_x$ in the X'-axis direction, and the angular velocity sensor 151 for the yaw direction detects an angular velocity $\omega_\psi$ about the Y' axis. Based on those detection values, the control apparatus 40 controls display of the pointer 2 so that the pointer 2 moves in the X-axis direction.

Meanwhile, as shown in FIG. 7B, in the reference position, the user swings the hand or the arm in the vertical direction, that is, the pitch direction. At this time, the acceleration sensor 162 for the Y'-axis direction detects an acceleration $a_y$ in the Y'-axis direction, and the angular velocity sensor 152 for the pitch direction detects an angular velocity $\omega_\theta$ about the X' axis. Based on those detection values, the control apparatus 40 controls display of the pointer 2 so that the pointer 2 moves in the Y-axis direction.

Although descriptions will be given later in detail, in one embodiment, the MPU 19 of the input apparatus 1 calculates velocity values in the X- and Y-axis directions based on the detection values detected by the sensor unit 17, in accordance with programs stored in the built-in nonvolatile memory. The input apparatus 1 transmits the velocity values to the control apparatus 40.

The control apparatus 40 converts a displacement in the X-axis direction per unit time into a displacement amount of the pointer 2 on the X axis on the screen 3, and converts a displacement in the Y-axis direction per unit time into a displacement amount of the pointer 2 on the Y axis on the screen 3, to thus move the pointer 2.

Typically, regarding the velocity values supplied every predetermined number of clocks, the MPU 35 of the control apparatus 40 adds an n-th velocity value that has been supplied to a (n−1)-th velocity value that has been supplied. Accordingly, the n-th velocity value that has been supplied corresponds to the displacement amount of the pointer 2, and coordinate information of the pointer 2 on the screen 3 is generated (coordinate information generation means).

(Principle for Calculating Velocity Values)

Figure 9:
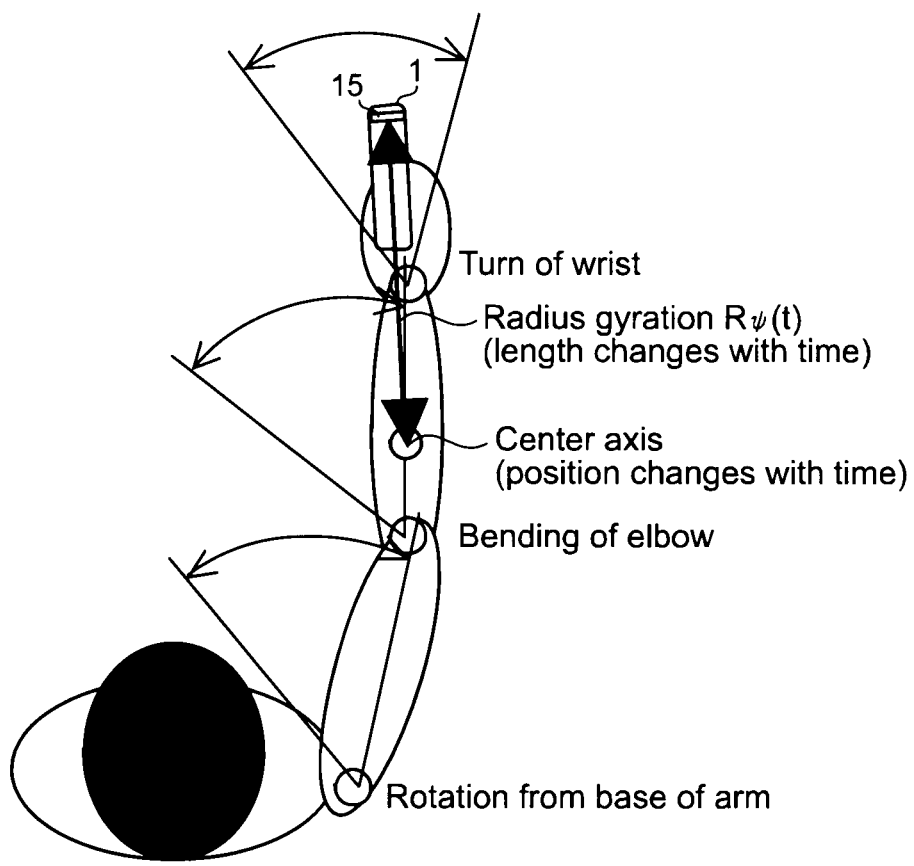
FIG. 9 is a top view of the user operating the input apparatus by swinging it in a lateral direction (yaw direction), for explaining a radius gyration.
Figure 10A:
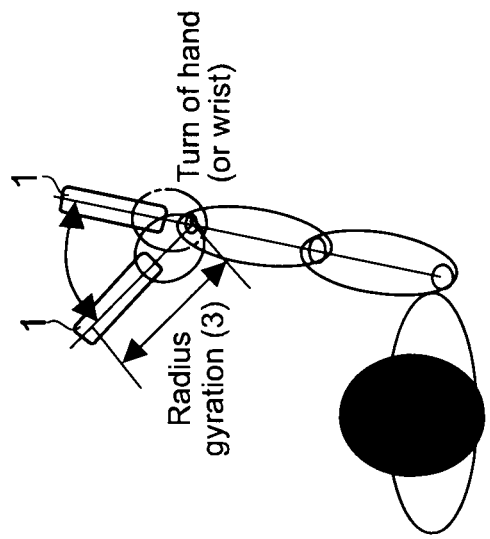
FIG. 10 are diagrams for explaining the operations of the user shown in FIG. 9 in more detail.
Figure 10B:
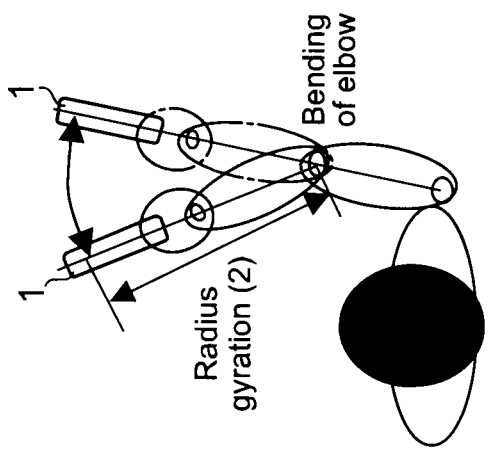

FIGS. 9 and 10 are diagrams for illustrating a basic idea of a method of calculating the velocity values of the casing 10 input to the input apparatus 1.

Figure 14:
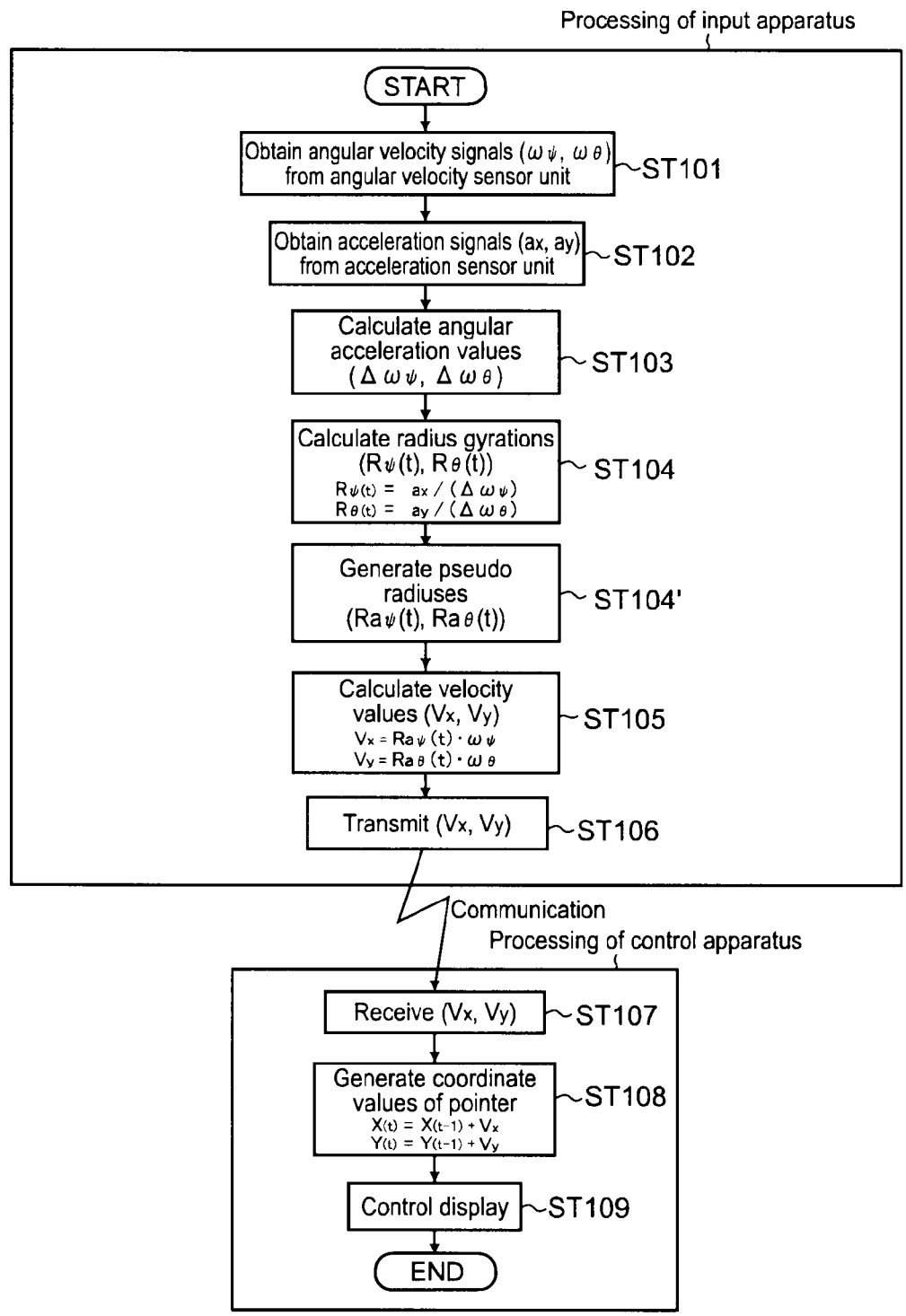
FIG. 14 is a flowchart showing an operation of the control system.

It should be noted that in FIG. 14 and the like, a form in which acceleration signals are obtained by the acceleration sensor unit after the angular velocity signals are obtained by the angular velocity sensor unit is shown. However, the present invention is not limited to this order, and a form in which the angular velocity signals are obtained after the acceleration signals or a form in which the acceleration signals and the angular velocity signals are obtained in parallel (simultaneously) is also possible (the same holds true for FIG. 15).

FIGS. 9 and 10 are each a top view of the user operating the input apparatus 1 by swinging it in, for example, the lateral direction (yaw direction). As shown in FIG. 9, when the user operates the input apparatus 1 naturally, an operation is made by using at least one of a turn of a wrist (or hand), a bending of an elbow, and a rotation from a base of an arm.

Figure 10C:
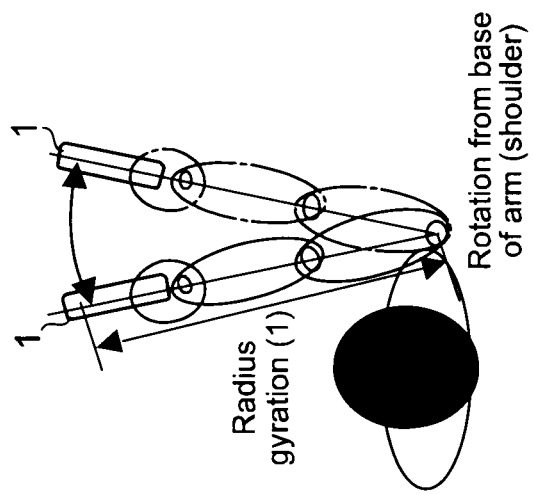

Specifically, the input apparatus 1 is operated by a rotational movement in which a movement of the entire body of the user is added to three rotations including the rotation about a base of an arm (shoulder) (see FIG. 10A), the rotation about an elbow (see FIG. 10B), and the rotation about a hand (or wrist) (see FIG. 10C). In other words, the hand, elbow, shoulder, and the like each become a rotational axis, and the rotational axes move successively or simultaneously. Specifically, the rotational movement of the input apparatus 1 at one instant is obtained by combining the rotational movements of the shoulder, elbow, hand, and the like. A position of a center axis of the thus-combined rotation changes with time, and a radius gyration R also changes with time.

Therefore, a comparison between the movement of the input apparatus 1 and the rotations of a shoulder, elbow, and hand shows that there exist relationships of 1 and 2 below.

1. The angular velocity value $\omega_\psi$ of the input apparatus 1 about the Y' axis is a combined value of an angular velocity obtained by the rotation about a shoulder, an angular velocity obtained by the bending of an elbow, an angular velocity obtained by the turn of a wrist, and an angular velocity obtained by a turn of a hand or the like.

2. The velocity value $V_x$ of the input apparatus 1 in the X-axis direction is a combined value of values obtained by respectively multiplying the angular velocities of the shoulder, elbow, hand, and the like by a distance between the shoulder and the input apparatus 1, a distance between the elbow and the input apparatus 1, a distance between the hand and the input apparatus 1, and the like.

Figure 11:
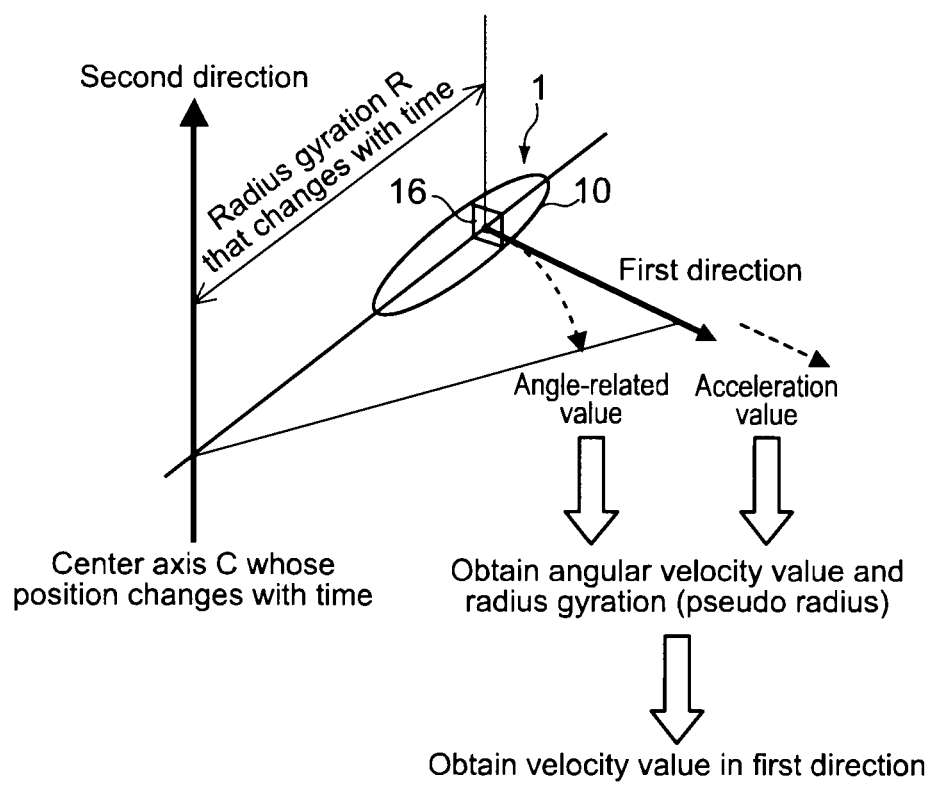
FIG. 11 is a diagram showing a principle of a method of calculating velocity values.

FIG. 11 is a diagram showing a principle of the velocity value calculation method that uses such an idea.

FIG. 11 shows a state at an instant the user moves the input apparatus 1 at a predetermined angular velocity in a direction in which a first direction is a tangent direction, for example. Based on an acceleration value a in the first direction obtained by the acceleration sensor unit 16 and an angle-related value (e.g., angular velocity value ω) of the input apparatus 1 about a center axis C at that instant, the input apparatus 1 can calculate the radius gyration R as a distance from the center axis C to the input apparatus 1. In addition, the input apparatus 1 can calculate a velocity value V of the casing 10 in the first direction based on the calculated radius gyration R.

As described above, a position of the rotational center axis C and the radius gyration R change with time. Further, the angular velocity value ω is an angular velocity value about a second direction orthogonal to the first direction, that is, the center axis C. With the first direction as the X'-axis direction, the angular velocity value ω is typically an angular velocity value about the Y'-axis direction obtained by the angular velocity sensor unit 15 provided inside the casing 10.

Specifically, when a radius gyration about the center axis C is represented by $R_\psi(t)$, a relationship between the velocity value $V_x$ of the input apparatus 1 and the angular velocity value $\omega_\psi$ about the direction of the center axis C can be expressed by Equation (1) below. In other words, the velocity value $V_x$ in the X-axis direction becomes a value obtained by multiplying the angular velocity value $\omega_\psi$ about the Y'-axis direction by the distance $R_\psi(t)$ between the center axis C and the input apparatus 1.

$$V_x = R_\psi(t) * \omega_\psi \qquad (1)$$

Figure 12:
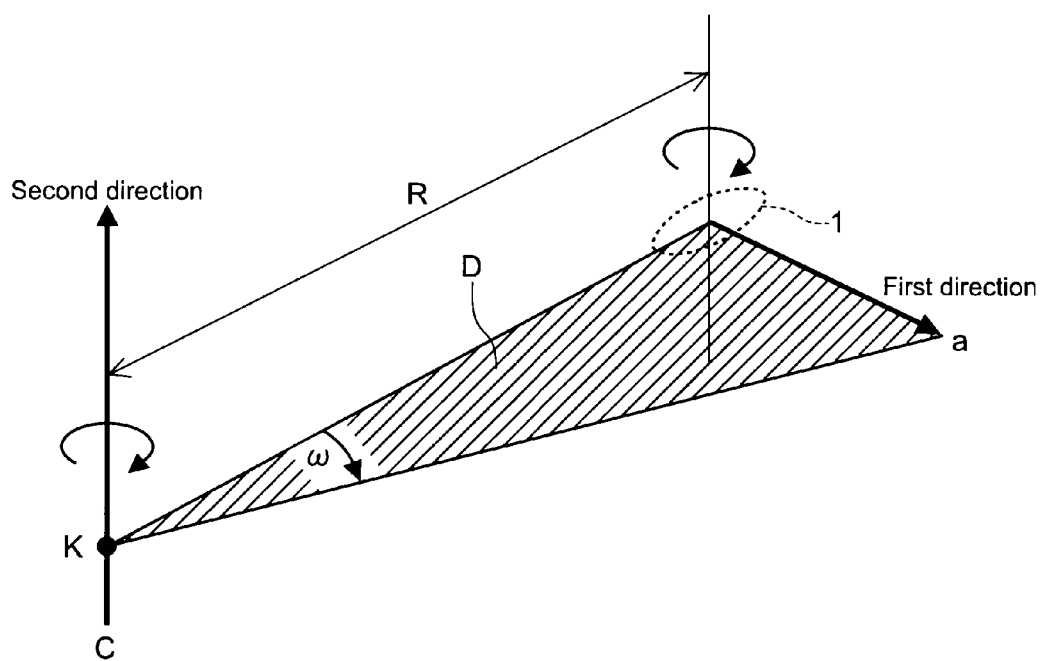
FIG. 12 is a principle diagram showing the principle of the method of calculating velocity values shown in FIG. 11 from a different viewpoint.

FIG. 12 is a principle diagram showing the principle of the velocity value calculation method shown in FIG. 11 from a different viewpoint.

A virtual plane D including an axis along a predetermined direction (e.g., first direction) and an instant center K about which the input apparatus 1 rotates with the first direction as the tangent direction will be discussed. The input apparatus 1 rotationally moves about an axis vertical to the virtual plane D (e.g., axis along second direction). Specifically, the rotational movement of the input apparatus 1 about the instant center K is obtained by combining the rotational movements of the shoulder, elbow, hand, and the like of the user. A position of a center of the thus-combined rotation, that is, the instant center K changes with time, and the radius gyration R included in the virtual plane D also changes with time.

Here, the first direction can be set as the X'-axis direction and the second direction can be set as the Y'axis direction, and the velocity value $V_x$ in the X'-axis direction can be calculated using Equation (1) above also in the principle shown in FIG. 12.

It should be noted that in this embodiment, the acceleration sensor unit 16 and the angular velocity sensor unit 15 are provided integrally on the circuit board 25 of the sensor unit 17. Therefore, in formality, the radius gyration R(t) becomes a distance from the center axis C to the sensor unit 17. However, in a case where the acceleration sensor unit 16 and the angular velocity sensor unit 15 are provided apart from each other inside the casing 10, a distance from the center axis C to a portion of the input apparatus 1 at which the acceleration sensor unit 16 is disposed (hereinafter, referred to as sensor arrangement portion) becomes the radius gyration R(t).

As expressed in Equation (1), the relationship between the velocity value and the angular velocity value at the sensor arrangement portion of the input apparatus 1 is a proportional relationship, that is, a correlation with R(t) as a proportional constant.

Equation (1) above is modified to obtain Equation (2)

$$R_\psi(t) = V_x/\omega_\psi \quad (2)$$

$V_x$ and $\omega_\psi$ on the right-hand side of Equation (2) are a velocity dimension. Even when the velocity value and the angular velocity value represented on the right-hand side of Equation (2) are differentiated and a dimension of the acceleration or acceleration time change rate is thus obtained, the correlation is not lost. Similarly, even when the velocity value and the angular velocity value are integrated and a displacement dimension is thus obtained, the correlation is not lost.

Therefore, with the velocity and the angular velocity represented on the right-hand side of Equation (2) as a dimension of the displacement, acceleration, and acceleration time change rate, Equations (3), (4), and (5) below can be obtained.

$$R_\psi(t) = x/\psi \quad (3)$$

$$R_\psi(t) = a_x/\Delta\omega_\psi \quad (4)$$

$$R_\psi(t) = \Delta a_x/\Delta(\Delta\omega_\psi) \quad (5)$$

Focusing on Equation (4) out of Equations (2), (3), (4), and (5) above, for example, it can be seen that the radius gyration $R_\psi(t)$ can be obtained if the acceleration value $a_x$ and the angular acceleration value $\Delta\omega_\psi$ are known. As described above, the acceleration sensor 161 detects the acceleration value $a_x$ in the X'-axis direction, and the angular velocity sensor 151 detects the angular velocity value $\omega_\psi$ about the Y' axis. Therefore, if the angular velocity value $\omega_\psi$ about the Y' axis is differentiated and the angular acceleration value $\Delta\omega_\psi$ about the Y' axis is thus calculated, the radius gyration $R_\psi(t)$ about the Y' axis can be obtained. The $R_\psi(t)$ is calculated by, for example, the MPU 19 of the input apparatus 1 (radius gyration calculation means).

If the radius gyration $R_\psi(t)$ about the Y' axis is known, the velocity value $V_x$ of the input apparatus 1 in the X'-axis direction can be obtained by multiplying the radius gyration $R_\psi(t)$ by the angular velocity value $\omega_\psi$ about the Y' axis detected by the angular velocity sensor 151 (see Equation (1)). Specifically, a rotational amount of rotational parts of a body of the user is converted into a linear velocity value in the X'-axis direction.

As described above, when the user operates the input apparatus, the rotational center of the apparatus corresponds to a position that is obtained by combining the rotational movements of the user and that changes with time (instant center). Therefore, when the input apparatus is operated by swinging the entire arm about the shoulder, the angular velocity to be detected becomes a relatively-small value. In this regard, by obtaining the velocity value $V_x$ by multiplying the radius gyration $R_\psi(t)$ by the angular velocity value $\omega_\psi$, even in the case of the above example (in the case where the input apparatus is operated by swinging the entire arm using the shoulder as an axis), the radius gyration $R_\psi(t)$ is detected as a relatively-large value. As a result, it becomes possible to obtain a sufficient velocity value $V_x$ that corresponds to the operational amount of the user. In addition, because it is unnecessary to calculate the velocity value by integrating the output value of the acceleration sensor, integration errors of the output value of the acceleration sensor can be suppressed, thus making it possible to perform accurate control.

On the other hand, when the velocity value $V_x$ calculated as described above is continued to be input in a state where a change in the acceleration or angular velocity is small due to a sensor detection limit or a sampling limit (attributable to sampling interval or resolution), the radius gyration $R_\psi(t)$ may not fall within an appropriate range and become too large or too small. Particularly when the radius gyration $R_\psi(t)$ is obtained through a differentiation operation, a possibility of such a calculation increases. As a result, there is a fear that the velocity value $V_x$ to be calculated becomes extremely large or becomes 0. Moreover, even when there is no problem in the operation, when the radius gyration $R_\psi(t)$ is calculated as an extremely small value, the velocity value $V_x$ to be calculated also becomes a small value, with the result that the user may feel that the movement is not enough. In this case, it becomes difficult to smoothly move the pointer on the screen, to thus result in lowering of an operability.

In this regard, for eliminating the lowering of an operability due to operational errors described above, in this embodiment, the velocity value $V_x$ is corrected as follows. Specifically, in this embodiment, the MPU 19 of the input apparatus 1 first generates, from the calculated radius gyration $R_\psi(t)$, a pseudo radius $Ra_\psi(t)$ related to a magnitude of the radius gyration $R_\psi(t)$. Then, by multiplying the generated pseudo radius $Ra_\psi(t)$ by the angular velocity value $\omega_\psi$ about the Y' axis, a pseudo velocity value $Va_x$ as the velocity value $V_x$ of the input apparatus 1 in the X'-axis direction is calculated (pseudo velocity calculation means).

$$Va_x = Ra_\psi * \omega_\psi \quad (6)$$

Figure 13:
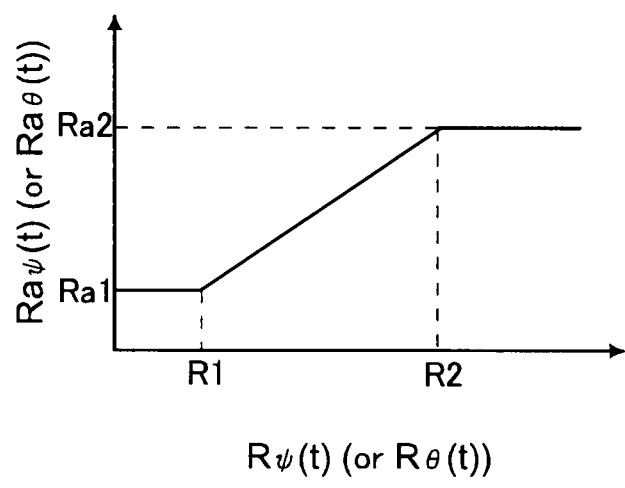
FIG. 13 is a diagram showing an example of a relationship between a radius gyration and a pseudo radius.

The generation method of the pseudo radius $Ra_\psi(t)$ can be set as appropriate. FIG. 13 shows an example of a relationship between the calculated radius gyration $R_\psi(t)$ and the generated pseudo radius $Ra_\psi(t)$.

As shown in FIG. 13, a minimum value of Ra1 and a maximum value of Ra2 are set for the pseudo radius $Ra_\psi(t)$. In this example, the pseudo radius $Ra_\psi(t)$ increases along with an increase of the radius gyration $R_\psi(t)$ when the radius gyration $R_\psi(t)$ is within a range from a first threshold value R1 to a second threshold value R2 (>R1). On the other hand, the pseudo radius $Ra_\psi(t)$ is fixed to a pseudo radius value (Ra2) obtained at a time the radius gyration $R_\psi(t)$ is at the second threshold value R2 when the radius gyration $R_\psi(t)$ exceeds the second threshold value R2, and fixed to a pseudo radius value (Ra1) obtained at a time the radius gyration $R_\psi(t)$ is at the first threshold value R1 when the radius gyration $R_\psi(t)$ falls below the first threshold value R1.

By thus setting the minimum value Ra1 and the maximum value Ra2 for the pseudo radius $Ra_\psi(t)$, even when the radius gyration $R_\psi(t)$ is extremely large or extremely small, reliability of the velocity value to be calculated can be secured. Moreover, it becomes possible to prevent an operability of the input apparatus 1 from being lowered. The minimum value Ra1 and the maximum value Ra2 of the pseudo radius are not particularly limited and can be set as appropriate within a range in which awkwardness due to a deviation between a psychological operational feeling and an actual operational amount is negligible.

By controlling the movement of the pointer 2 using the pseudo velocity value $Va_x$ calculated as described above, the movement of the pointer matches an intuition of the user operating the input apparatus. Further, the movement of the pointer 2 can be made a natural movement with respect to the movement of the input apparatus 1, and an operability of the input apparatus 1 for the user can be improved.

The calculation method of the pseudo velocity value is also applicable to a case where the user operates the input apparatus 1 by swinging it in the vertical direction (pitch direction). Specifically, when operating the input apparatus 1 by swinging it in the vertical direction, the MPU 19 calculates a radius gyration $R_\theta(t)$, a pseudo radius $Ra_\theta(t)$, and a pseudo velocity value $Va_y$ by a method similar to that of the above example (radius gyration calculation means, pseudo velocity calculation means).

It should be noted that regarding the sensor unit 17, the case where the detection axes of the X' axis and the Y' axis of the angular velocity sensor unit 15 and the detection axes of the X' axis and the Y' axis of the acceleration sensor unit 16 respectively match each other has been described as a typical example. Specifically, the acceleration value $a_x$ in the first direction (e.g., X'-axis direction) is detected by the acceleration sensor 161 for X' axis detection, and the angular velocity value $\omega_\psi$ is detected by the angular velocity sensor 151 for yaw direction detection that has a detection axis matching the direction of the Y' axis that is orthogonal to the X' axis and is a detection axis of the acceleration sensor 162.

However, the detection axes of the angular velocity sensor unit 15 and the detection axes of the acceleration sensor unit 16 do not necessarily need to match. For example, in a case where the angular velocity sensor unit 15 and the acceleration sensor unit 16 are mounted on a substrate, the angular velocity sensor unit 15 and the acceleration sensor unit 16 may be mounted while being deviated a predetermined rotational angle within a main surface of the substrate so that the detection axes of the angular velocity sensor unit 15 and the acceleration sensor unit 16 do not match. In this case, the accelerations and angular velocities with respect to the respective axes can be obtained by a calculation that uses a trigonometric function.

Moreover, the detection axes of each of the angular velocity sensor unit 15 and the acceleration sensor unit 16 of the sensor unit 17 do not necessarily need to be mutually orthogonal like the X' axis and the Y' axis described above. In this case, the accelerations respectively projected in the mutually-orthogonal axial directions can be obtained by a calculation that uses the trigonometric function. Similarly, the angular velocities about the mutually-orthogonal axes can be obtained by the calculation that uses the trigonometric function.

(Operation of Control System)

An operation of the control system 100 that uses the velocity value calculation method described above will be described with reference to FIG. 14. FIG. 14 shows a case where Equation (4) above, for example, is used in calculating the radius gyrations ($R_\psi(t)$, $R_\theta(t)$).

Power of the input apparatus 1 is turned on. For example, the user turns on a power supply switch or the like provided to the input apparatus 1 or the control apparatus 40 to turn on the power of the input apparatus 1.

Here, as shown in FIGS. 9 and 10, the user uses a rotation of at least one of a shoulder, an elbow, a hand, and the like to move the input apparatus 1. The rotational movement of the input apparatus 1 at one instant is obtained by combining the rotational movements of a shoulder, an elbow, a hand, and the like as described above. The position of the center axis of the thus-combined rotation changes with time, and the radius gyration R also changes with time. In descriptions below, an operation carried out at that instant will be described.

When the user moves the input apparatus 1 as described above, biaxial angular velocity signals are output from the angular velocity sensor unit 15. The MPU 19 obtains a first angular velocity value $\omega_\psi$ and a second angular velocity value $\omega_\theta$ from the biaxial angular velocity signals (Step 101).

Upon turning on the power of the input apparatus 1, biaxial acceleration signals are output from the acceleration sensor unit 16. The MPU 19 obtains a first acceleration value $a_x$ and a second acceleration value $a_y$ from the biaxial acceleration signals (Step 102). The acceleration signals are signals corresponding to the position of the input apparatus 1 at a point the power is turned on.

It should be noted that the MPU 19 typically carries out Steps 101 and 102 in sync.

By differentiating the angular velocity values ($\omega_\psi$, $\omega_\theta$) obtained in Step 101, the MPU 19 calculates angular acceleration values ($\Delta\omega_\psi$, $\Delta\omega_\theta$) as angle-related values (Step 103). A differentiation filter or a highpass filter, for example, is used for the differentiation operation.

The MPU 19 uses the acceleration values ($a_x$, $a_y$) obtained in Step 102 and the angular acceleration values ($\Delta\omega_\psi$, $\Delta\omega_\theta$) to calculate radius gyrations ($R_\psi(t)$, $R_\theta(t)$) about the Y' axis and the X' axis, that is, the instant centers using Equations (4) and (4'), respectively (Step 104).

$$R_\psi(t)=a_x/\Delta\omega_\psi \tag{4}$$

$$R_\theta(t)=a_y/\Delta\omega_\theta \tag{4'}$$

Next, the MPU 19 generates pseudo radiuses ($Ra_\psi(t)$, $Ra_\theta(t)$) based on the radius gyrations ($R_\psi(t)$, $R_\theta(t)$) obtained in Step 104 (Step 104'). As shown in FIG. 13, the pseudo radiuses ($Ra_\psi(t)$, $Ra_\theta(t)$) are generated in relation to the magnitude of the radius gyrations ($R_\psi(t)$, $R_\theta(t)$). The pseudo radiuses ($Ra_\psi(t)$, $Ra_\theta(t)$) are generated by, for example, an operation. Specific operations are as follows.

$$\text{When } R_\psi(t)<R1, Ra_\psi(t)=Ra1 \tag{7}$$

$$\text{When } R1 \leq R_\psi(t) \leq R2, Ra_\psi(t)=k*R_\psi(t) \tag{8}$$

$$\text{When } R2<R_\psi(t), Ra_\psi(t)=Ra2 \tag{9}$$

$$\text{When } R_\theta(t)<R1, Ra_\theta(t)=Ra1 \tag{7'}$$

When $R1 \leq R_\theta(t) \leq R2$, $Ra_\theta(t)=k'*R_\theta(t)$ (8')

When $R2 < R_\theta(t)$, $Ra_\theta(t)=Ra2$ (9')

(where k and k' are constants)

After calculating the pseudo radius gyrations, the MPU 19 calculates pseudo velocity values ($Va_x$, $Va_y$) as the velocity values ($V_x$, $V_y$) by Equations (6) and (6') above (Step 105).

$$V_x=Va_x=Ra_\psi(t)*\omega_\psi \quad (6)$$

$$V_y=Va_y=Ra_\theta(t)*\omega_\theta \quad (6')$$

The angular velocity values ($\omega_\psi$, $\omega_\theta$) used herein are typically angular velocity values ($\omega_\psi$, $\omega_\theta$) that have been subjected to the differentiation operation in Step 103. However, the angular velocity values ($\omega_\psi$, $\omega_\theta$) used in Step 105 may alternatively be angular velocity values obtained by the MPU 19 that are temporally close to the angular velocity values that have been subjected to the differentiation operation.

As described above, since the rotational amount of the rotational parts of the body of the user at a time the user operates the input apparatus 1 is converted into linear velocity values in the X- and Y-axis directions, it becomes possible to obtain sufficient linear velocity values that correspond to the actual operational amount of the user. As a result, the velocity values obtained match the intuition of the user.

The MPU 19 only needs to obtain ($a_x$, $a_y$) every predetermined number of clocks and calculate the velocity values ($V_x$, $V_y$) in sync therewith, for example. Alternatively, the MPU 19 may calculate the velocity values ($V_x$, $V_y$) once every time a plurality of acceleration values ($a_x$, $a_y$) are sampled.

The MPU 19 transmits the calculated velocity values ($V_s$, $V_y$) to the control apparatus 40 via the transmitting device 21 (Step 106).

The MPU 35 of the control apparatus 40 receives information on the velocity values ($V_s$, $V_y$) (pseudo velocity values ($Va_x$, $Va_y$); the same holds true for descriptions below) (Step 107). The input apparatus 1 transmits the velocity values ($V_x$, $V_y$) every predetermined number of clocks, that is, per unit time, so the control apparatus 40 can receive them and obtain displacement amounts in the X- and Y-axis directions per unit time. The MPU 35 generates coordinate values (X(t), Y(t)) of the pointer 2 on the screen 3 that correspond to the obtained displacement amounts in the X- and Y-axis directions per unit time, using Equations (10) and (10') below (Step 108). Based on the generated coordinate values, the MPU 35 controls display so that the pointer 2 moves on the screen 3 (Step 109) (coordinate information generation means).

$$X(t)=X(t-1)+V_x \quad (10)$$

$$Y(t)=Y(t-1)+V_y \quad (10')$$

As described above, the input apparatus 1 of this embodiment calculates the velocity values ($V_x$, $V_y$) based on the acceleration values and the angular velocity values. Typically, the input apparatus 1 calculates the radius gyrations ($R_\psi(t)$, $R_\theta(t)$) and pseudo radiuses ($Ra_\psi(t)$, $Ra_\theta(t)$) about the center axis C shown in FIG. 11 or the instant center K shown in FIG. 12, and calculates the velocity values ($V_x$, $V_y$) (pseudo velocity values ($Va_x$, $Va_y$)) based on those values. Because the velocity values are calculated based on the radius gyrations as described above, the input apparatus 1 of this embodiment can calculate accurate linear velocities (at the sensor arrangement portion) of the input apparatus 1. Furthermore, since the input apparatus 1 does not carry out the integration operation, integration errors are not caused. Accordingly, the movement of the pointer 2 that moves on the screen 3 in accordance with the displacements corresponding to the velocity values becomes a natural movement that matches the sense of the user.

In FIG. 14, the input apparatus 1 has carried out the main operations to calculate the velocity values ($V_x$, $V_y$). In an embodiment shown in FIG. 15, the control apparatus 40 carries out the main operations.

Figure 15:
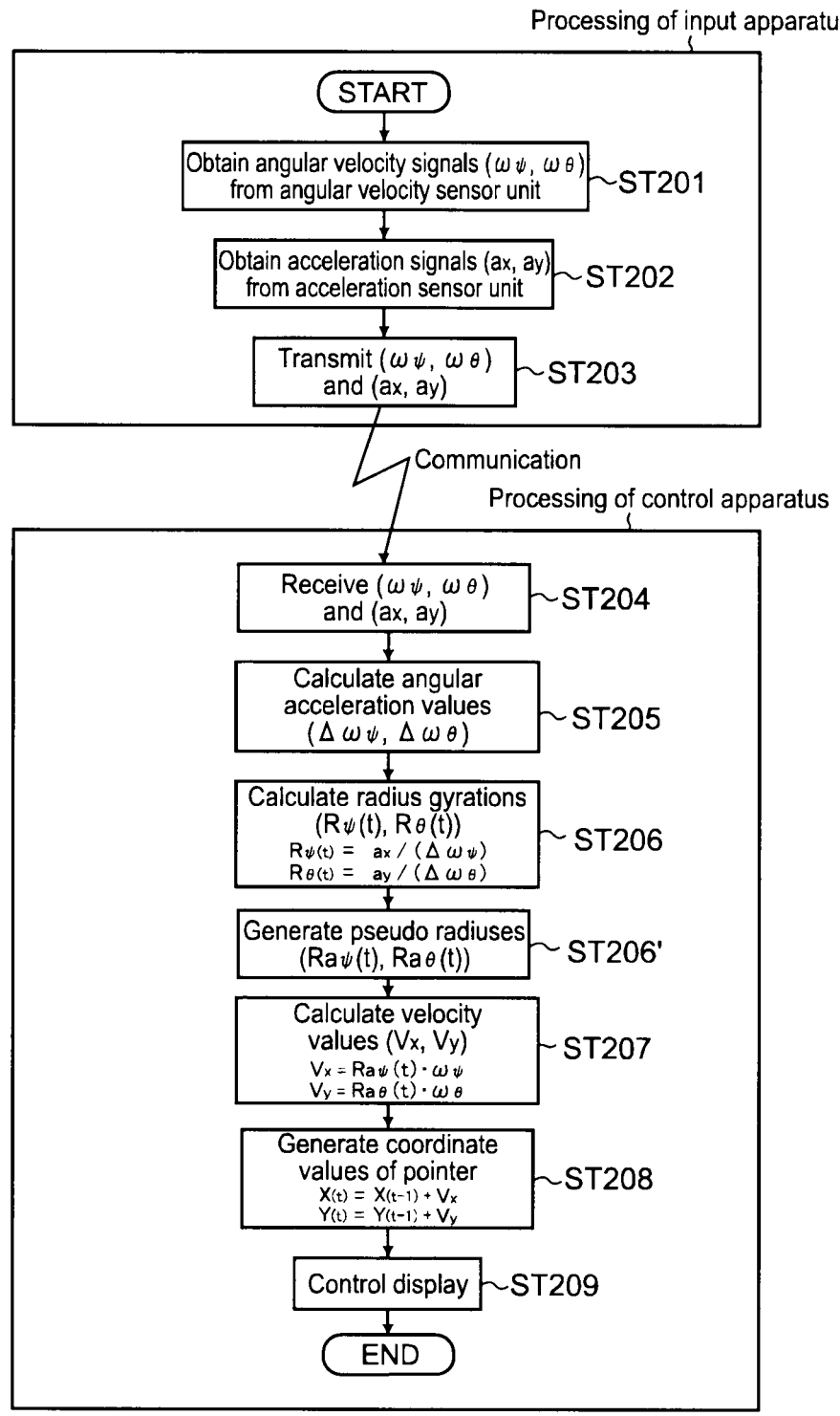
FIG. 15 is a flowchart showing an operation corresponding to FIG. 14 in a case where a control apparatus carries out main operations.

The input apparatus 1 transmits biaxial acceleration values and biaxial angular velocity values output from the sensor unit 17 to the control apparatus 40 as input information, for example (Step 203). The MPU 35 of the control apparatus 40 receives the input information (Step 204) and carries out processes that are the same as those of Steps 103 to 105, 108, and 109 (Steps 205 to 209). Accordingly, the MPU 35 of the control apparatus 40 calculates the velocity values (pseudo velocity values) in the X- and Y-axis directions and controls display so that the pointer 2 moves in accordance with the calculated velocity values (FIG. 15).

MODIFIED EXAMPLE

The embodiments of the present invention have been described heretofore. However, the present invention is not limited to those embodiments, and various modifications can be made based on the technical idea of the present invention.

For example, a ratio of an acceleration change rate to an angular acceleration change rate may be used for calculating the radius gyrations ($R_\psi(t)$, $R_\theta(t)$) as in Equation (5). Accordingly, an effect of a gravity acceleration can be removed from the detected acceleration values. Specifically, there is a case where the gravity acceleration is detected while being biased by a constant value or biased in terms of a low frequency when detecting acceleration values. In this case, by differentiating the acceleration values, even when a change in a component force of the gravity acceleration due to a tilt of the input apparatus is caused, the radius gyrations can be calculated appropriately, and appropriate velocity values can be calculated from the radius gyrations.

Moreover, the generation method of the pseudo radiuses ($Ra_\psi(t)$, $Ra_\theta(t)$) is not limited to the example shown in FIG. 13. For example, it is also possible to set only one of the minimum value Ra1 and the maximum value Ra2 for the pseudo radius value shown in FIG. 13.

Figure 16A:
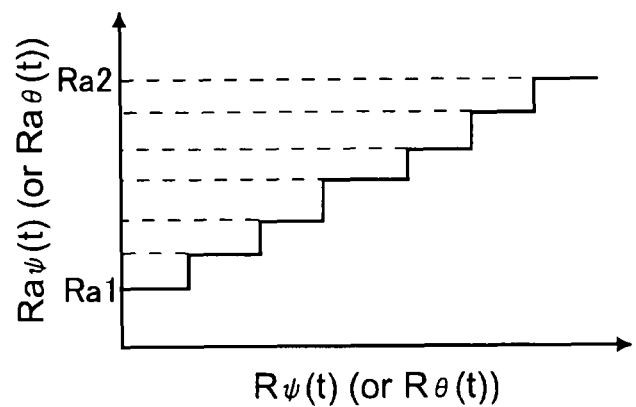
FIG. 16 are diagrams showing several other examples of the relationship between the radius gyration and the pseudo radius.

Further, as shown in FIG. 16A, it is also possible to store a plurality of pseudo radius values segmented in accordance with a magnitude of the radius gyrations in a memory of the MPU 19 (35) in advance and select one of the plurality of pseudo radius values corresponding to the calculated radius gyration. The number of pseudo radius values to be selected is not particularly limited, and there only needs to be at least 2 (e.g., minimum and maximum values). Accordingly, an operational amount can be reduced, and the MPU 19 (35) can be structured at low costs.

Figure 16B:
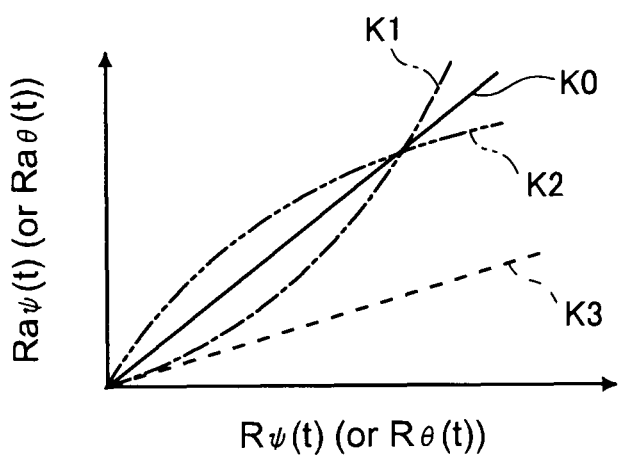

On the other hand, although the pseudo radius has increased in proportion to the radius gyration when the radius gyration is within the range from R1 to R2 as shown in FIG. 13, a proportionality factor can be set as appropriate. Alternatively, it is possible to increase the pseudo radius exponentially or logarithmically along with an increase of the radius gyration. FIG. 16B shows several examples of the relationship between the radius gyration and the pseudo radius. In the figure, K0 and K3 are examples in which the pseudo radius that is in proportion to the magnitude of the radius gyration is generated, and K1 and K2 are examples in which the pseudo radius that increases by a quadratic curve along with an increase of the radius gyration is generated.

An enumeration function of the pseudo radius can be set as appropriate. For defining the function, for example, an evaluation conducted by a plurality of users of an input apparatus prepared by swinging the input apparatus by various functions is useful. Specifically, the enumeration function of the pseudo radius is determined based on an operation time of a test item, operational accuracy, an impression of use of the user, and the like.

In the above embodiments, the pseudo radiuses ($Ra_\psi(t)$, $Ra_\theta(t)$) have been obtained individually. However, the velocity values ($V_x$, $V_y$) (pseudo velocity values ($Va_x$, $Va_y$)) may be calculated by using one of the pseudo radiuses ($Ra_\psi(t)$, $Ra_\theta(t)$) as a representative value. Alternatively, the velocity values ($V_x$, $V_y$) (pseudo velocity values ($Va_x$, $Va_y$)) may be calculated using a mean value of the pseudo radiuses ($Ra_\psi(t)$, $Ra_\theta(t)$).

In the above embodiments, the transmitting device 21 has been used as a transmission means of the input apparatus 1 and the receiver device 38 has been used as a reception means of the control apparatus 40. However, the transmission means and the reception means may be structured as a transceiver that has both the transmission function and the reception function.

The input apparatus described in the above embodiments has transmitted the input information to the control apparatus wirelessly. However, the input information may be transmitted by wire.

The present invention is applicable to, for example, a handheld-type electronic apparatus or information processing apparatus (handheld apparatus) including a display section. In other words, the handheld apparatus may have a structure in which the input apparatus 1 and the control apparatus 40 are integrated. In this case, by the user moving a main body of the handheld apparatus, a pointer displayed on a screen of the display section is moved, or scroll and zoom control of the screen is performed. Examples of the handheld apparatus include a PDA (Personal Digital Assistance), a cellular phone, a portable music player, and a digital camera.

An angle sensor or an angular acceleration sensor may be used instead of the angular velocity sensor unit 15. Examples of the angle sensor include a geomagnetic sensor and an image sensor. Change amounts of angle values are detected when using, for example, triaxial geomagnetic sensors. Thus, in this case, the angle values are differentiated to thus obtain angular velocity values. The angular acceleration sensor is structured as a combination of a plurality of acceleration sensors, and the angular velocity values are obtained by integrating angular acceleration values obtained by the angular acceleration sensor.

The present application contains subject matter related to that disclosed in Japanese Priority Patent Application JP 2009-064730 filed in the Japan Patent Office on Mar. 17, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An input apparatus, comprising:
a casing;
a first acceleration detection section to detect a first acceleration value of the casing in a first direction;
a first angle-related value detection section to detect a first angle-related value of the casing as a value related to an angle about an axis in a second direction different from the first direction;
a radius gyration calculation means for calculating, based on the first acceleration value and the first angle-related value that have been detected, a first radius gyration of the casing about the axis in the second direction, the first radius gyration being a distance from a rotational center axis whose position changes with time to the first acceleration detection section; and
a pseudo velocity calculation means for generating a first pseudo radius related to a magnitude of the calculated first radius gyration and calculating a first pseudo velocity value as a velocity value of the casing in the first direction by multiplying the generated first pseudo radius by a first angular velocity value obtained based on the first angle-related value,
wherein the first pseudo radius increases as the first radius gyration increases when the first radius gyration is within a first range from a first threshold value to a second threshold value larger than the first threshold value and is fixed to a value obtained at a time the first radius gyration is at the second threshold value when the first radius gyration is within a second range exceeding the second threshold value.

2. The input apparatus according to claim 1, wherein the first pseudo radius increases as the first radius gyration increases when the first radius gyration is within the first range from the first threshold value to the second threshold value larger than the first threshold value and is fixed to a value obtained at a time the first radius gyration is at the first threshold value when the first radius gyration is within a third range below the first threshold value.

3. The input apparatus according to claim 1,
wherein the pseudo velocity calculation means includes a plurality of pseudo radius values segmented in accordance with the magnitude of the first radius gyration and selects one pseudo radius value determined based on the calculated first radius gyration out of the plurality of pseudo radius values.

4. The input apparatus according to claim 1,
wherein the radius gyration calculation means calculates an acceleration change rate as a time change rate of the first acceleration value, calculates an angular acceleration change rate as a time change rate of an angular acceleration about the axis in the second direction based on the detected first angle-related value, and calculates a ratio of the calculated acceleration change rate to the calculated angular acceleration change rate as the first radius gyration.

5. The input apparatus according to claim 1,
wherein the radius gyration calculation means calculates an angular acceleration value based on the detected first angle-related value and calculates a ratio of the first acceleration value to the angular acceleration value as the first radius gyration.

6. The input apparatus according to claim 1,
wherein the first angle-related value detection section includes an angular velocity sensor that detects an angular velocity about the axis in the second direction.

7. The input apparatus according to claim 1, further comprising:
a second acceleration detection section to detect a second acceleration value of the casing in the second direction; and a second angle-related value detection section to detect a second angle-related value as a value related to an angle about an axis in the first direction, wherein the radius gyration calculation means calculates, based on the second acceleration value and the second angle-related value that have been detected, a second radius gyration of the casing about the axis in the first direction, the second radius gyration being a distance from the rotational center axis whose position changes with time to the second acceleration detection section, and wherein the pseudo velocity calculation means acquires a second pseudo radius related to a magnitude of the calculated second radius gyration and calculates a second pseudo velocity value as a velocity value of the casing in the second direction by multiplying the acquired second pseudo radius by a second angular velocity value obtained based on the second angle-related value.

8. The input apparatus according to claim 7,
wherein the second angle-related value detection section includes an angular velocity sensor that detects an angular velocity about the axis in the first direction.

9. A control apparatus controlling display of a pointer displayed on a screen based on information transmitted from an input apparatus including a casing, a first acceleration detection section that detects a first acceleration value of the casing in a first direction, a first angle-related value detection section that detects a first angle-related value of the casing as a value related to an angle about an axis in a second direction different from the first direction, and a transmission means for transmitting the information on the first acceleration value and the first angle-related value, the control apparatus comprising:

a reception means for receiving the transmitted information on the first acceleration value and the first angle-related value;

a radius gyration calculation means for calculating, based on the first acceleration value and the first angle-related value that have been received, a first radius gyration of the casing about the axis in the second direction, the first radius gyration being a distance from a rotational center axis whose position changes with time to the first acceleration detection section;

a pseudo velocity calculation means for generating a first pseudo radius related to a magnitude of the calculated first radius gyration and calculating a first pseudo velocity value as a velocity value of the casing in the first direction by multiplying the generated first pseudo radius by a first angular velocity value obtained based on the first angle-related value; and a coordinate information generation means for generating coordinate information of the pointer on the screen that corresponds to the calculated first pseudo velocity value, wherein the first pseudo radius increases as the first radius gyration increases when the first radius gyration is within a first range from a first threshold value to a second threshold value larger than the first threshold value and is fixed to a value obtained at a time the first radius gyration is at the second threshold value when the first radius gyration is within a second range exceeding the second threshold value.

10. The control apparatus according to claim 9, wherein the first pseudo radius increases as the first radius gyration increases when the first radius gyration is within the first range from the first threshold value to the second threshold value larger than the first threshold value and is fixed to a value obtained at a time the first radius gyration is at the first threshold value when the first radius gyration is within a third range below the first threshold value.

11. A control system, comprising:
an input apparatus including
a casing,
a first acceleration detection section that detects a first acceleration value of the casing in a first direction,
a first angle-related value detection section that detects a first angle-related value of the casing as a value related to an angle about an axis in a second direction different from the first direction,
a radius gyration calculation means for calculating, based on the first acceleration value and the first angle-related value that have been detected, a first radius gyration of the casing about the axis in the second direction, the first radius gyration being a distance from a rotational center axis whose position changes with time to the first acceleration detection section,
a pseudo velocity calculation means for generating a first pseudo radius related to a magnitude of the calculated first radius gyration and calculating a first pseudo velocity value as a velocity value of the casing in the first direction by multiplying the generated first pseudo radius by a first angular velocity value obtained based on the first angle-related value, and
a transmission means for transmitting information on the calculated first pseudo velocity value; and
a control apparatus including
a reception means for receiving the transmitted information on the first pseudo velocity value, and
a coordinate information generation means for generating coordinate information of a pointer on a screen that corresponds to the received first pseudo velocity value,
wherein the first pseudo radius increases as the first radius gyration increases when the first radius gyration is within a first mange from a first threshold value to a second threshold value larger than the first threshold value and is fixed to a value obtained at a time the first radius gyration is at the second threshold value when the first radius gyration is within a second range exceeding the second threshold value.

12. The control system according to claim 11, wherein the first pseudo radius increases as the first radius gyration increases when the first radius gyration is within the first range from the first threshold value to the second threshold value larger than the first threshold value and is fixed to a value obtained at a time the first radius gyration is at the first threshold value when the first radius gyration is within a third range below the first threshold value.

13. A control system, comprising:
an input apparatus including
a casing,
a first acceleration detection section that detects a first acceleration value of the casing in a first direction,
a first angle-related value detection section that detects a first angle-related value of the casing as a value related to an angle about an axis in a second direction different from the first direction, and
a transmission means for transmitting information on the first acceleration value and the first angle-related value; and
a control apparatus including
a reception means for receiving the transmitted information on the first acceleration value and the first angle-related value, a radius gyration calculation means for calculating, based on the first acceleration value and the first angle-related value that have been received, a first radius gyration of the casing about the axis in the second direction, the first radius gyration being a distance from a rotational center axis whose position changes with time to the first acceleration detection section, a pseudo velocity calculation means for generating a first pseudo radius related to a magnitude of the calculated first radius gyration and calculating a first pseudo velocity value as a velocity value of the casing in the first direction by multiplying the generated first pseudo radius by a first angular velocity value obtained based on the first angle-related value, and a coordinate information generation means for generating coordinate information of a pointer on a screen that corresponds to the calculated first pseudo velocity value, wherein the first pseudo radius increases as the first radius gyration increases when the first radius gyration is within a first range from a first threshold value to a second threshold value larger than the first threshold value and is fixed to a value obtained at a time the first radius gyration is at the second threshold value when the first radius gyration is within a second range exceeding the second threshold value.

14. The control system according to claim 13, wherein the first pseudo radius increases as the first radius gyration increases when the first radius gyration is within the first range from the first threshold value to the second threshold value larger than the first threshold value and is fixed to a value obtained at a time the first radius gyration is at the first threshold value when the first radius gyration is within a third range below the first threshold value.

15. A control method, comprising:
detecting a first acceleration value of a casing of an input apparatus in a first direction;
detecting a first angle-related value of the casing as a value related to an angle about an axis in a second direction different from the first direction;
calculating, based on the first acceleration value and the first angle-related value that have been detected, a first radius gyration of the casing about the axis in the second direction, the first radius gyration being a distance from a rotational center axis whose position changes with time to a detection position of the first acceleration value;
generating a first pseudo radius related to a magnitude of the calculated first radius gyration; and
calculating a first pseudo velocity value as a velocity value of the casing in the first direction based on the generated first pseudo radius and a first angular velocity value obtained based on the first angle-related value,
wherein the first pseudo radius increases as the first radius gyration increases when the first radius gyration is within a first range from a first threshold value to a second threshold value larger than the first threshold value and is fixed to a value obtained at a time the first radius gyration is at the second threshold value when the first radius gyration is within a second range exceeding the second threshold value.

16. The control method according to claim 15, wherein the first pseudo radius increases as the first radius gyration increases when the first radius gyration is within the first range from the first threshold value to the second threshold value larger than the first threshold value and is fixed to a value obtained at a time the first radius gyration is at the first threshold value when the first radius gyration is within a third range below the first threshold value.

17. A control apparatus controlling display of a pointer displayed on a screen based on information transmitted from an input apparatus including a casing, a first acceleration detection section that detects a first acceleration value of the casing in a first direction, a first angle-related value detection section that detects a first angle-related value of the casing as a value related to an angle about an axis in a second direction different from the first direction, and a transmission means for transmitting the information on the first acceleration value and the first angle-related value, the control apparatus comprising:
a reception section to receive the transmitted information on the first acceleration value and the first angle-related value;
a radius gyration calculation section to calculate, based on the first acceleration value and the first angle-related value that have been received, a first radius gyration of the casing about the axis in the second direction, the first radius gyration being a distance from a rotational center axis whose position changes with time to the first acceleration detection section;
a pseudo velocity calculation section to generate a first pseudo radius related to a magnitude of the calculated first radius gyration and calculate a first pseudo velocity value as a velocity value of the casing in the first direction by multiplying the generated first pseudo radius by a first angular velocity value obtained based on the first angle-related value; and
a coordinate information generation section to generate coordinate information of the pointer on the screen that corresponds to the calculated first pseudo velocity value,
wherein the first pseudo radius increases as the first radius gyration increases when the first radius gyration is within a first range from a first threshold value to a second threshold value larger than the first threshold value and is fixed to a value obtained at a time the first radius gyration is at the second threshold value when the first radius gyration is within a second range exceeding the second threshold value.

18. The control apparatus according to claim 17, wherein the first pseudo radius increases as the first radius gyration increases when the first radius gyration is within the first range from the first threshold value to the second threshold value larger than the first threshold value and is fixed to a value obtained at a time the first radius gyration is at the first threshold value when the first radius gyration is within a third range below the first threshold value.

* * * * *